United States Patent
Einstein et al.

(10) Patent No.: US 11,455,492 B2
(45) Date of Patent: Sep. 27, 2022

(54) VERTEX INTERPOLATION IN ONE-SHOT LEARNING FOR OBJECT CLASSIFICATION

(71) Applicant: Buyaladdin.com, Inc., Los Angeles, CA (US)

(72) Inventors: Theodore Aaron Einstein, Boca Raton, FL (US); Tereza Manukian, Boca Raton, FL (US); Boris Mocialov, Oslo (NO); Jin Hwan Park, Seoul (KR)

(73) Assignee: BuyAladdin.com, Inc., Los Angeles, CA (US)

( * ) Notice: Subject to any disclaimer, the term of this patent is extended or adjusted under 35 U.S.C. 154(b) by 0 days.

(21) Appl. No.: 17/520,443

(22) Filed: Nov. 5, 2021

(65) Prior Publication Data

US 2022/0147766 A1    May 12, 2022

Related U.S. Application Data

(60) Provisional application No. 63/110,475, filed on Nov. 6, 2020.

(51) Int. Cl.
  *G06K 9/62* (2022.01)
  *G06N 3/04* (2006.01)
  *G06V 20/00* (2022.01)
(52) U.S. Cl.
  CPC .............. *G06K 9/6256* (2013.01); *G06N 3/04* (2013.01); *G06V 20/00* (2022.01)
(58) Field of Classification Search
  CPC ......... G06K 9/6256; G06N 3/04; G06V 20/00
  See application file for complete search history.

(56) References Cited

U.S. PATENT DOCUMENTS 10,157,504 B1    12/2018   Jain
10,382,799 B1 *   8/2019   Walters ................. G06F 40/117
(Continued)

FOREIGN PATENT DOCUMENTS

JP      6752978 B2     9/2020
KR   10-1715036 B1     3/2017
KR   10-2151006 B1     9/2020

OTHER PUBLICATIONS

Azulay et al., "Why do deep convolutional networks generalize so poorly to small image transformations?," Journal of Machine Learning Research, 2019, pp. 1-25 [retrieved on Jan. 27, 2022], Retrieved from <https://jmlr.org/papers/volume20/19-519/19-519.pdf>.

(Continued)

*Primary Examiner* — Aaron W Carter
(74) *Attorney, Agent, or Firm* — Fenwick & West LLP (57) ABSTRACT

A computer implemented method for generating synthetic training data to train a convolutional neural network is described. The method consists of steps including receiving a source image depicting an object for identification. The type and shape of the depicted object is determined. The source image is overlayed with a N×M grid of vertices, the grid including horizontal and vertical edges and being fit to the shape of the depicted object. For each vertex in the grid, perturbations are added to the (x,y) coordinates of the vertex and the pixel values in a range between the original and final (x,y) coordinates are interpolated, resulting in the generation of an item of synthetic training data. The method is repeated to generate multiple items of synthetic training data which are then used to train a neural network to identify the object in an image.

20 Claims, 5 Drawing Sheets

(56) References Cited

U.S. PATENT DOCUMENTS

| | | | |
|---|---|---|---|
| 10,529,137 B1* | 1/2020 | Black | G06T 13/40 |
| 10,664,722 B1* | 5/2020 | Sharma | G06V 20/00 |
| 10,679,046 B1* | 6/2020 | Black | G06N 3/0454 |
| 10,860,836 B1* | 12/2020 | Tyagi | G06K 9/627 |
| 10,909,349 B1* | 2/2021 | Tripathi | G06V 10/25 |
| 2009/0207179 A1* | 8/2009 | Huang | G06T 15/205 |
| | | | 345/505 |
| 2010/0209009 A1* | 8/2010 | Matsunaga | H04N 9/04557 |
| | | | 382/224 |
| 2016/0110619 A1* | 4/2016 | Kim | B60R 11/04 |
| | | | 382/104 |
| 2017/0061625 A1* | 3/2017 | Estrada | G06T 7/90 |
| 2017/0116703 A1* | 4/2017 | Sundareson | G06T 3/0018 |
| 2018/0181802 A1* | 6/2018 | Chen | G06V 10/454 |
| 2018/0240257 A1* | 8/2018 | Li | G06N 3/084 |
| 2018/0336605 A1 | 11/2018 | Volta | |
| 2019/0108396 A1 | 4/2019 | Dal Mutto et al. | |
| 2019/0164209 A1 | 5/2019 | Park | |
| 2019/0251397 A1* | 8/2019 | Tremblay | G06K 9/6257 |
| 2019/0286938 A1* | 9/2019 | Backhus | G06T 17/20 |
| 2019/0287301 A1* | 9/2019 | Colbert | G06K 9/6256 |
| 2019/0355150 A1* | 11/2019 | Tremblay | G06T 7/73 |
| 2020/0210768 A1* | 7/2020 | Turkelson | G06K 9/6218 |
| 2020/0265495 A1 | 8/2020 | Cho | |
| 2021/0004589 A1* | 1/2021 | Turkelson | G06T 5/00 |
| 2021/0110454 A1 | 4/2021 | Kim | |
| 2021/0166477 A1* | 6/2021 | Bunkasem | G06K 9/6262 |
| 2022/0067994 A1* | 3/2022 | Neuberger | G06N 3/0454 |
| 2022/0147766 A1* | 5/2022 | Shterenberg | G06N 3/04 |

OTHER PUBLICATIONS

International Search Report and Written Opinion, Patent Cooperation Treaty Application No. PCT/IB2021/060291, dated Feb. 11, 2022, 10 pages.

Kim et al., "Object Dimension Estimation for Remote Visual Inspection in Borescope Systems," KSII Transactions on Internet and Information Systems, Aug. 31, 2019, vol. 13, No. 8, pp. 4160-4173 [retrieved on Jan. 27, 2022], Retrieved from <https://www.koreascience.or.kr/article/JAKO201926358473648.page>.

Zhang et al., "Adversarial Interpolation Training: A Simple Approach for Improving Model Robustness," Dec. 24, 2019, pp. 1-18 [retrieved on Jan. 27, 2022], Retrieved from <https://openreview.net/forum?id=Syejj0NYvr>.

* cited by examiner

VERTEX INTERPOLATION IN ONE-SHOT LEARNING FOR OBJECT CLASSIFICATION

CROSS REFERENCE TO RELATED APPLICATIONS

This application claims the benefit of U.S. Provisional Patent Application No. 63/110,475, filed on Nov. 6, 2020, which is incorporated by reference herein.

FIELD

The subject matter described herein relates to image processing, including generating synthetic images for the purpose of training a convolutional neural network that is used to classify objects in images.

BACKGROUND INFORMATION

Users of social networks and other online systems often look to other users when making their own purchasing decisions. For example, a user might see a photo in a social networking feed of a friend or influencer wearing a dress or holding a purse and want to purchase that object for themselves. However, because of the large number of images available to users of these platforms, it is impractical for humans to augment each image with metadata describing the object in the image. There are multiple techniques designed to recognize items in 2D images, such as template matching or region proposal methods with different generalization results. However, to achieve high generalization, these techniques commonly require magnitudes of data.

In the case of retail items, distributors may only provide a single image of the item that is being sold. The single provided image poses challenges when training data-driven methods to recognize individual retail items. There is thus a need for an automated augmentation process for such items that only have one or few examples. While machine learning models, such as neural networks, may be trained to identify objects in images, existing models struggle due to the wide range of object positions and perspectives required for training. Additionally, while conventional image augmentation methods, such as resizing or cropping, may be used to modify a single image of the object, these methods negatively impact the quality of the object in the image (e.g., by removing or adding pixels) and fail to accurately reflect the natural warping of objects that can occur in real life.

SUMMARY

Described herein are methods for generating synthetic training data used to train a convolutional neural network to identify objects in images. The described methods mitigate sparsity of realistic data required for training convolutional neural networks. One described use case includes the fashion retail context, where a convolutional neural network is trained to recognize a specific garment using a single example of that garment. However, one of skill in the art will appreciate that the methods described herein may be used to identify a variety of objects beyond apparel, such as cars, furniture, accessories, and the like. Additional embodiments include identifying defects in a manufacturing context by using the method to generate negative training data representing unwanted variations (e.g., defects) of an object.

In some embodiments the method includes receiving a source image depicting an object for identification. A type and shape of the depicted object in the source image is determined. An N×M grid of vertices and horizontal and vertical edges are overlayed onto the source image to fit the shape of the depicted object. For each vertex, perturbations are added to the (x,y) coordinates of the vertex and pixel values are interpolated in a range between the original and final (x,y) coordinates to generate an item of synthetic training data. Some steps of the method are repeated to create a plurality of synthetic training data items.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

In one embodiment, an object identification system receives an ingested image (also referred to as a source image) and augments an object in the image by modifying the morphology of the object while preserving the object's integrity. In one embodiment, the system performs object augmentation in real-time, generating modified images comprising training data that are immediately used to train the neural network. Alternatively, the training data is stored for later use rather than real-time use. In various embodiments, the system uses reference images depicting similar objects to perform complex augmentations that may result from a change in camera orientation, and augments the image by seeding the image with vertices appropriate to the object in the image. The vertices form a morphological structure that fits the object in the image. In various embodiments, the system then modifies the location of the vertices, interpolating the edges and the corresponding pixel values as the warping process commences. If the image orientation is augmented, the system may use a reference image with a similar orientation and map the morphologies to the image. Using this process, the system can generate a plurality of augmented images of the object (also referred to as "synthetic training data") and use the source image and the augmented images to train the convolutional neural network. In augmenting the ingested image, the system preserves the details of the image so that the object has visually realistic modifications based on the known taxonomies of different objects. For example, the system may base the augmentations of the image on the type of object. An image of a pair of pants, for instance, may be augmented around the knees or hips, since those regions are most likely to be warped in an image due to movement of the wearer. Once trained, the convolutional neural network identifies the object in an unseen image and can provide metadata to a viewing user about the identified object, such as a name of the object, one or more retailers from which the object may be purchased, and a price of the object at each of the identified retailers.

The methods described herein achieve greater accuracy in recognizing garments and discovering items, and are more resilient to the changes in orientation of the items of interest than standard data augmentation approaches. The described methods thus overcome the issue of not having enough training data to identify objects from a source image with significant perturbations in orientation or form.

Figure 1:
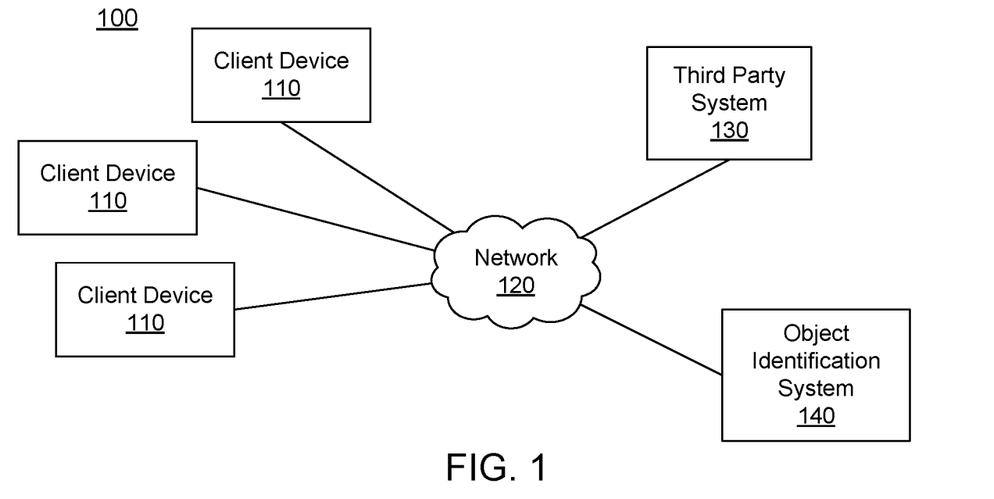
FIG. 1 is a block diagram of a system environment in which an object identification system operates, in accordance with an embodiment.

FIG. 1 is a block diagram of a system environment 100 for an object identification system 140. The system environment 100 shown by FIG. 1 comprises one or more client devices 110, a network 120, one or more third-party systems 130, and the object identification system 140. In alternative configurations, different or additional components may be included in the system environment 100.

The client devices 110 are one or more computing devices capable of receiving user input as well as transmitting or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device.

The client devices 110 are configured to communicate via the network 120, which may comprise any combination of local area or wide area networks, using both wired or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the object identification system 140 and the client devices 110. For example, in one embodiment a client device 110 executes a browser application to enable interaction between the client device, the object identification system 140, and the third-party systems 130 via the network 120. In another embodiment, the client device 110 interacts with the third-party system through an application programming interface (API) running on a native operating system of the client device 110, such as IOS® or ANDROID™. Additionally, in some embodiments, the object identification system 140 is implemented as a plug-in to the third-party system 130.

In one embodiment, the third-party system 130 is a social networking system or other online system through which users can create, view, and interact with content items, such as photos and videos. These content items may be created and shared on the third-party system 130 by individual users and/or by entities such as business or organizations. Individual and entity (e.g., organization or company) users of the third-party system 130 may be associated with user profiles or pages through which the user posts information about itself or about its products and/or links to a third-party website where the user's products may be purchased.

In one embodiment, the object identification system 140 generates synthetic training data items based on a source image by modifying the morphology of a depicted object. For example, if the depicted object is a t-shirt, the system 140 modifies the source image to show the t-shirt in a large number of different positions and from varying perspectives. The variety of positions and perspectives creates a large set of training images (each an item of synthetic training data) with modified morphology as the system generates training images for each position, training images for each perspective, and training images of all combinations of the positions and perspectives. By modifying the source image in this way, a large set of training images is created from a single source image. For example, the system 140 may modify the source image to mimic the ways the t-shirt may crease when worn. The synthetic training data items are then used to train a convolutional neural network to identify the depicted object in an input image (e.g., in an image displayed in a user's social networking feed).

Figure 2:
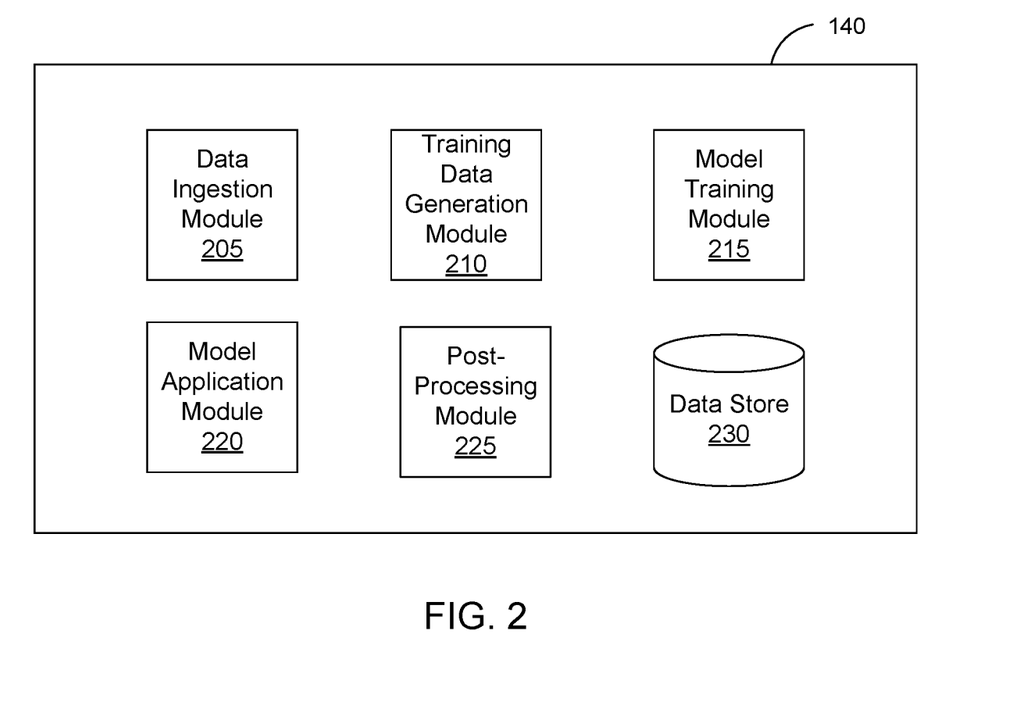
FIG. 2 is a block diagram of an object identification system, in accordance with an embodiment.

FIG. 2 is a block diagram of an architecture of the object identification system 140 according to one embodiment. In the embodiment shown, the object identification system 140 includes a data ingestion module 205, a training data generation module 210, a model training module 215, a model application module 220, a post-processing module 225, and a data store 230. In other embodiments, the object identification system 140 includes additional, fewer, or different components for various applications. Components such as network interfaces, security functions, load balancers, failover servers, management and network operations consoles, and the like are not shown so as to not obscure the details of the system architecture. In addition, the functions may be distributed among the elements in a different manner than described.

The data ingestion module 205 ingests images that include depictions of objects for identification by the neural network. For example, an ingested image may depict a dress displayed on a model or mannequin. In alternate embodiments, the object is depicted without a wearer (e.g., the dress is displayed on a hanger or is disposed flat against a background). Additionally, in some embodiments, the source image includes a front view of the object, while in other embodiments, a side view or rear view of the object is shown. The module 205 may ingest images such as by scraping image data from retail websites. A person of skill in the art will recognize that images may be sourced via other commonly used techniques in the field.

The source images may be received from one or more third-party systems 130 or websites through which users may purchase, rent, or otherwise obtain the depicted objects. Additionally, in some embodiments, the data ingestion module 205 receives, for each source image, metadata associated with the depicted object. The metadata may include, for example, identifying information about the object, such as a name of the object; a description of the object; a style number of the object; a depicted size, color, fabric, or print of the object; a date or season during which the object became available; a source of the object; one or more retailers from which the object may be purchased; a price of the object at each of the identified retailers; and a deep-link. The source image and associated metadata may be sent to the data store 230 for storage.

The data ingestion module 205 also sends the ingested source image to the training data generation module 210, which modifies the depicted object in the source image to generate synthetic training data. In one embodiment, the training data generation module 210 uses a machine learning classifier to identify the type and shape of a depicted object in the source image. For example, the training data generation module 210 may use a multi-layer convolutional neural network to determine a garment type (e.g., pants or a shirt). If the model output equals or exceeds a confidence threshold (e.g., if the model predicts with high confidence that the source image depicts a shirt), the training data generation module 210 overlays a fine warping grid and warps specified parts of the object in the source image (according to the known taxonomy of a shirt). If the model output is below the confidence threshold, the training data generation module 210 uses a standard N×N grid. Additionally or alternatively, the data ingestion module 205 determines the type and shape of the depicted object from the received metadata. In one embodiment, if there are multiple objects within the source image, such as a photo of a model wearing a shirt and pants and holding a purse, the data ingestion module 205 identifies the three objects separately. The training data generation module 210 then fits a grid to each object in the image and creates a set of training data for each object separately. The data ingestion module 205 may further receive user input selecting a specific object of the source image such that the training data generation module 210 only applies a grid to the selected object.

In response to determining the type and shape of the depicted object in the source image, the data ingestion module 205 overlays the source image with evenly spaced vertices and horizontal and vertical edges to form an N×M grid and fits the overlaid grid to the shape of the depicted object by deactivating portions of the grid outside of the outline of the object. In one embodiment, the grid is a 10×10 grid (i.e., the grid has 10 rows and 10 columns). Alternatively, other size grids may be used. In some embodiments, the size of the grid may be based in part on the type and size of the depicted object in the source image. For example, if the depicted object is a pair of pants that occupies a large portion of the source image, the training data generation module 210 uses a larger grid than if the depicted object were a t-shirt that occupies a smaller portion of the source image. Still further, different size grids may be used for different items of synthetic training data. For example, the training data generation module 210 might generate a first training data item using a 10×10 grid and a second training data item based on the same source image using a 15×15 grid. In one embodiment, the dimensions of the grid are based on the amount of detail in the object. For example, a patterned dress with ruffles may be overlaid with a finer grid having more vertices than a grid for a t-shirt dress in a solid color.

In various embodiments, to create an item of synthetic training data from the source image, the training data generation module 210 modifies the location (i.e., the x,y coordinates) of the vertices in the grid in a pseudo-random or random move and interpolates the pixel values based on the updated vertex positions (i.e., in a range between the original and modified coordinates). This process is repeated for each vertex in the grid. In some embodiments, the grid is further adjusted based on the type of object depicted in the source image, and the distribution of vertices may be non-uniform. For example, if the depicted item is a t-shirt, the training data generation module 210 may move the vertices corresponding to the t-shirt sleeve differently or more aggressively (i.e., by adding larger perturbations) than other portions of the object, such as the torso (which is less likely to move than the sleeves). To determine how to interpolate different portions of the depicted object, the training data generation module 210 identifies different parts of the object based on a known taxonomy (i.e., that a sleeve of a t-shirt has a larger range of movement than the torso). The objects in each item of synthetic training data retain the level of detail in the source image despite the pixel modifications. In examples with detailed objects, each vertex of the grid may be moved less than the vertices of a simpler object. The decreased perturbation of the grid of the detailed object increases the level of detail that is retained.

Figure 5:
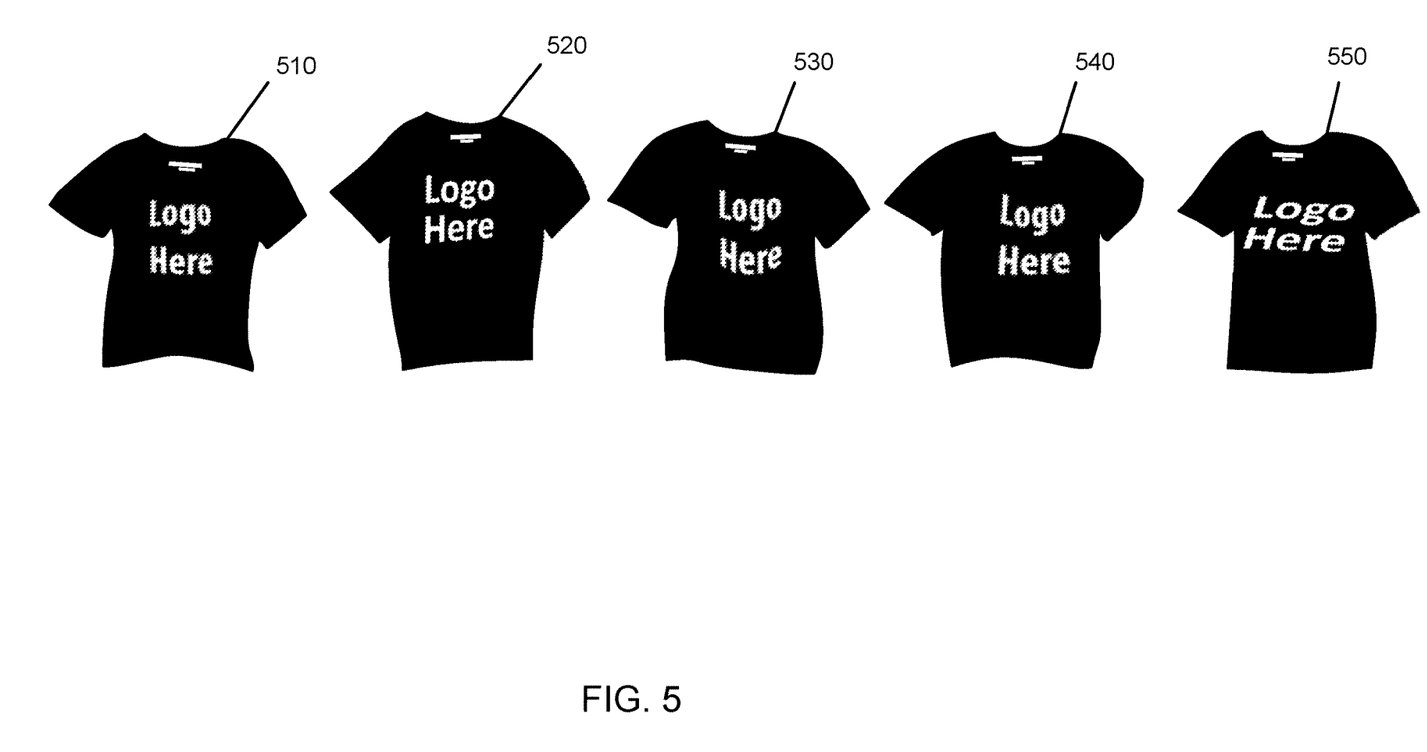
FIG. 5 illustrates example items of synthetic training data generated based on a source image, in accordance with an embodiment.

In various embodiments, the number of synthetic training data items created for an object is a specified number (e.g., 10,000) or may be based in part on the type of object depicted in the source image. For example, the training data generation module 210 may create a larger number of synthetic training data items for a t-shirt than for a pair of pants based on the expected range of motion for each object. As shown in FIG. 5, the wearer of a t-shirt is expected to move both their arms and torso at various angles such that the training data generation module 210 creates a larger number of synthetic training data items for a t-shirt than for a pair of pants, for which the wearer is expected only to move their legs at a smaller angles.

The training data generation module 210 may store the items of synthetic training data (e.g., in the data store 230) and/or provide them to the model training module 215, which trains a convolutional neural network to identify objects in images using the synthetic training data. In some embodiments, the synthetic training data includes positive examples that have been determined to include the object for which the neural network is being trained. For example, a human may label the source image used to generate the synthetic training data items (e.g., from the received metadata) and synthetic items generated from the source image are classified as positive examples of the depicted object. Additionally, the training data includes negative examples that lack the object in question. For example, in one embodiment, the negative examples are training data items that depict different objects such that the neural network is trained to identify multiple objects at the same time. In other embodiments, the model training module 215 uses regional proposals in which a default class (e.g., associated with the background of the source image) is negative. The training algorithm extracts feature values from the images in the training set, the features being variables deemed potentially relevant to whether the images include the object in question.

In various embodiments, the feature values extracted include the raw pixel values in the source image. An ordered list of the features for an image is herein referred to as the feature vector for the image. In one embodiment, dimensionality reduction is used (e.g., via linear discriminant analysis (LDA), principal component analysis (PCA), or the like) to reduce the amount of data in the feature vectors for images to a smaller, more representative set of data.

By utilizing the known morphology of the object in a source image, the system can further augment the object by substituting parts of the same or different objects to create both positive or negative training examples of training data that may be used to train the neural network. For example, for a source image depicting a t-shirt with short sleeves, the system could use the morphology of the t-shirt to substitute one sleeve with another, such as a long sleeve, from the same or another image.

Generation and use of negative training data (i.e., data that represents unwanted variations of an object) can be applied to contexts outside of the retail context. In some embodiments, the method of applying a grid to an identified object in a source image and creating multiple synthetic training data images by adding perturbations to the grid can additionally be used in manufacturing contexts to identify defects. For example, in one embodiment, the model is trained to recognize defects by augmenting the depicted object in a source image to represent defective forms. In some embodiments where little variation of the object is possible, for example, a small number (e.g., 10) defective forms may be created by the method by augmenting the image, while in other embodiments where the object may exhibit a wide variety of defects, the method creates a larger number (e.g., 1000 or more) defective forms. The model can then compare a source image to any of the defective augmentations in the training data and label the object in the image as defective. The training data may also include a reference image with positive data representing an undefective form.

In one example use case, the source image depicts a soldering joint on a printed circuit board (PCB). The data ingestion module 205 identifies the object in the source image as a solder joint using a machine learning classifier. The module 205 then accesses a reference image stored in the data store 230 having positive data for the object, such as showing a preferred, undefective solder joint. The module 205 additionally accesses a set of training data for the identified object, the PCB, containing a set of defective variations of the object. The model is trained on both the reference image that lacks the defect, as well as the training data that includes variations of defects. Once trained, the model outputs a prediction of whether the object in an image is defective or not based on the image's similarity to the reference image or the training data.

The training algorithm uses supervised machine learning to train the neural network, with the feature vectors of the positive training set and the negative training set serving as the inputs. For example, backpropagation and gradient descent may be used to minimize the number of errors in the predictions made by the neural network. Where the neural network outputs probability, the error may be considered to be the difference between the ground truth and the probability outputted by the neural network.

In some embodiments, a validation set is formed of additional images that have already been determined to have or lack the object in question. The trained neural network is applied to the images in the validation set to quantify the accuracy of the neural network. Metrics applied in accuracy measurement include: Precision=TP/(TP+FP) and Recall=TP/(TP+FN), where precision is how many images the neural network 314 correctly predicted (TP or true positives) out of the total it predicted (TP+FP, where FP is false positives), and recall is how many images the neural network 314 correctly predicted (TP) out of the total number of images that did have the object in question (TP+FN or false negatives). The F score (F-score=2*PR/(P+R)) unifies precision (P) and recall (R) into a single measure. In one embodiment, the neural network is iteratively re-trained until the occurrence of a stopping condition, such as the accuracy measurement indication that the model is sufficiently accurate, or a number of training rounds having taken place.

The model application module 220 applies the trained model to input images (i.e., from the third-party system 130) to identify objects in the images. Regardless of the specifics of how it is trained, the neural network outputs a prediction of whether the specified object (e.g., a specific shirt or pair of pants) is present in an input image. The predictions may be Boolean (object present or not) or may indicate a probability that the object is present (e.g., a percentage likelihood).

In some embodiments, the neural network is trained to identify objects that are similar but not the same as the object in the source image. For example, if the source image is a t-shirt with a vintage or worn down logo, the model can identify images of unfaded shirts or a similar shirt with a the logo in a different style. In another example, if the source image is a t-shirt with a logo, the model may also identify a hoodie with a similar logo. Similar objects may be identified by the neural network by lowering a similarity threshold of the system. For the neural network to identify an object that is the same as the object in the source image the similarity threshold, for example, is set to 95% or higher. However, for the neural network to identify similar objects the similarity threshold may, for example, be set to 80%.

In some embodiments there may be multiple similarity thresholds that can be set by user input. For example, the user may want to find a shirt that is the same color and pattern as the shirt in the source image but has long sleeves instead of short. With that input, similarity thresholds for the color and pattern may be set to 95% while the similarity threshold for the sleeves may be set to 80%.

In some embodiments, a post-processing module 225 determines what (if any) further action to take in view of the output from the neural network. For example, in one embodiment, for images that the neural network determines contain a specified object, the post-processing module 225 retrieves metadata for the identified object from the data store 230 and associates the retrieved metadata with the input image. This metadata may be presented to users in conjunction with the image and/or cause presentation of supplemental information, such as identifying information for the object (e.g., a name of the object, a product number, a size, and the like). The supplemental information may additionally include a link to one or more third-party website (s) where the object can be purchased, and, in some embodiments, a list of current prices of the object on each of the third-party websites.

Figure 3:
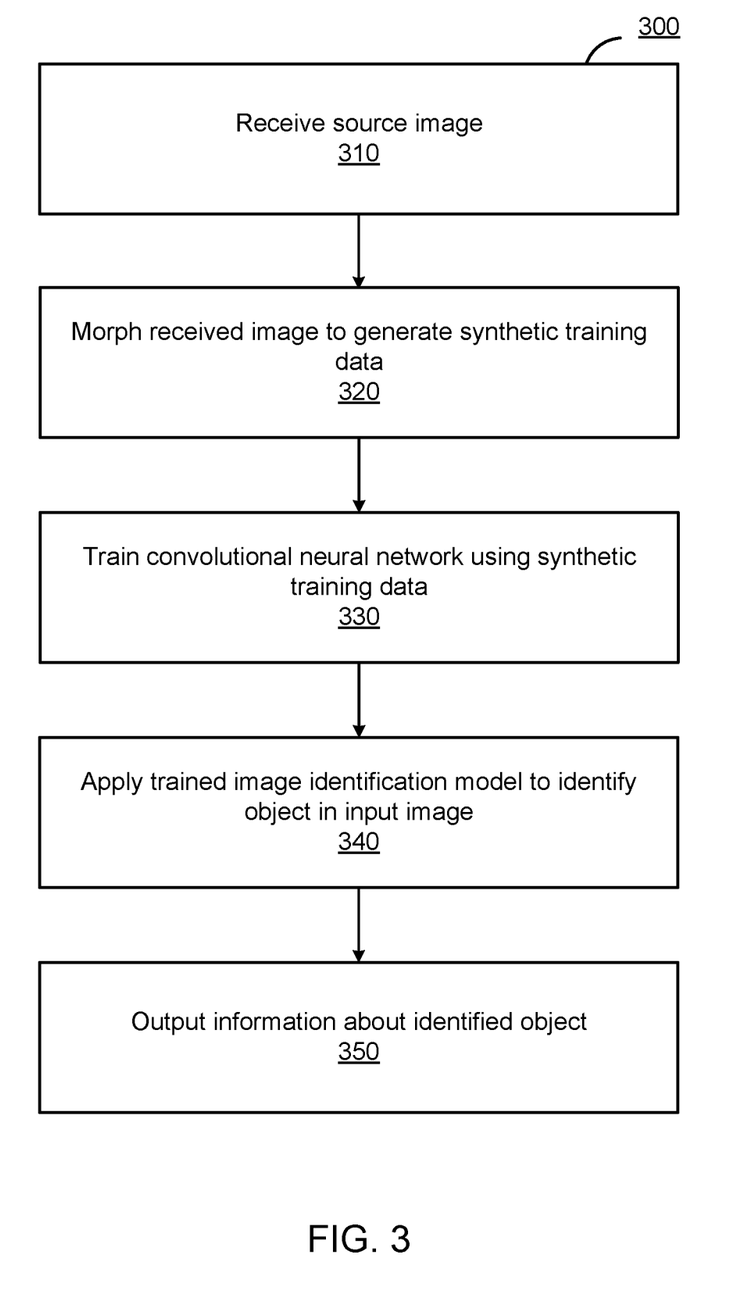
FIG. 3 is a flowchart illustrating a method for identifying an object in an image by an image identification model, in accordance with an embodiment.

FIG. 3 illustrates an example method for identifying an object in an image by an image identification model, in accordance with an embodiment. The steps of FIG. 3 are illustrated from the perspective of the object identification system 140 performing the method 300. However, some or all of the steps may be performed by other entities and/or components. In addition, some embodiments may perform the steps in parallel, perform the steps in different orders, or perform different steps.

In the embodiment shown in FIG. 3, the method 300 begins with the data ingestion module 205 receiving 310 a source image depicting one or more objects for identification. The source image may be in a variety of formats comprising .jpg, .jpeg, and .png. The source image may be received via a network 120 from a third-party system 130 and may be associated with metadata that includes identifying information about an object in the source image, as discussed above with respect to FIG. 2.

The data ingestion module 205 sends the received source image to the training data generation module 210, which morphs 320 the image to generate a plurality of items of synthetic training data. In each item of synthetic training data, the training data generation module 210 modifies the morphology of the object while preserving the details in the original source image and creates visually realistic modifications based on known taxonomies of the depicted objects.

Figure 4:
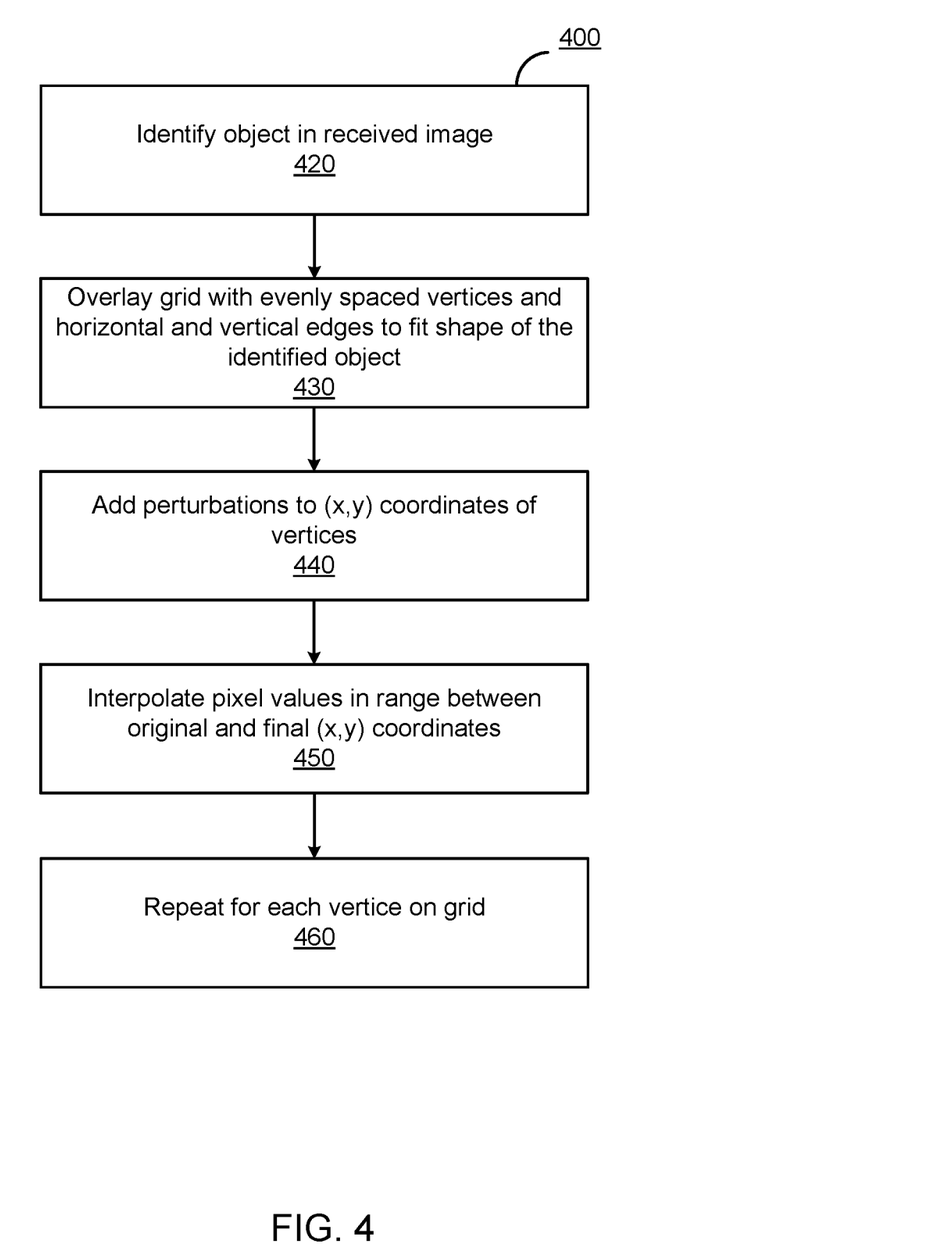
FIG. 4 is a flowchart illustrating a method for generating synthetic training data to train the image identification model, in accordance with an embodiment.

A training data generation method is described and shown in FIG. 4. The method 400 begins with the training data generation module 210 identifying 420 an object in the received source image. In various embodiments the training data generation module 210 applies a classifier to determine a type of depicted object (e.g., a shirt or pair of pants) or determines an object type based on metadata associated with the received source image.

The training data generation module 210 overlays 430 the source image with evenly spaced vertices and horizontal and vertical edges to fit the shape of the identified object in the source image. In one embodiment, the grid has a specified number of rows and columns regardless of the object depicted in the source image. Alternatively, the size of the grid is based in part on the size, shape, or type of depicted object, as discussed above with respect to FIG. 2.

The training data generation module 210 adds 440 perturbations to the (x,y) coordinates of the vertices in the grid and interpolates 450 the pixel values in the range between the original and final (x,y) coordinates. This process is repeated 460 for each vertex in the grid to create an item of synthetic training data from the original source image. In this way, the object in the source image is augmented in a manner that reflects the natural warping of the object (e.g., the movement and folds of a shirt) and preserves the quality of the image. In one embodiment method 400 is repeated several times to generate a plurality of synthetic training data items that each depict the object in a different position. The number of repetitions of the method may be based on the known taxonomy of the object. For example, an item such as a pair of pants that is known to exhibit a lot of movement may have the method repeated 1000 times or more to represent a variety of depictions of the pants with different perturbations. Similarly, an item such as a purse that is more rigid than a pair of pants may only have the method run 100 times on it since there are fewer variations to portray with perturbations.

Returning now to FIG. 3, after generating the items of synthetic training data, the training data generation module 210 sends the training data to the model training module 215, which trains 330 the convolutional neural network using the synthetic training data, as discussed above with respect to FIG. 2. Once trained, the convolutional neural network may be used to identify an object depicted in an input image. For example, in embodiments in which the object identification system 140 is implemented as a plug-in to the third-party system 130, the model application module 220 may receive an input image through the third-party system and apply 340 the trained model to identify an object in the input image. Responsive to receiving the object identification from the neural network, the post-processing module 225 retrieves metadata associated with the object from the data store 230 and outputs 350 information associated with the identified object, i.e., on the display of the client device 110. In various embodiments, the associated information may include a name of the object, a description of the object, and one or more retailers or other providers from whom a user may purchase the object.

FIG. 5 illustrates a series of example synthetic training data items generated based on an object in a source image. In the embodiment shown in FIG. 5, the depicted object is a t-shirt. For each item of training data, the training data generation module 210 performs natural warping of the object, as discussed above with respect to FIG. 2, from the single source image. The described augmentation method reflects the natural warping of clothing items that can be observed in real life, for example, as a wearer of the t-shirt twists or turns their torso and/or raises or lowers their arms. For example, the shirt 540 may reflect the warping of a t-shirt worn by a person that is raising their arms to the side of their body, resulting in the arms of the shirt 540 being slightly raised and the logo being curved away from the neck. The augmentation of the source image includes applying a grid to the source image and modifying the positions of the edges and vertices of the grid, and interpolating the pixel values in between the vertices. This augmentation results in a warped image. In FIG. 5, the source image is a t-shirt and the source image has been augmented 5 times to create 5 items of training data showing warped t-shirts. The augmented images mimic the folding and skewing of a t-shirt that may occur during wear or display. For example the body of the t-shirt may become twisted, or the sleeves may be creased as seen in shirts 510, 520, and 530. The shirt 550 may depict the warping of a t-shirt when the wearer leans to the right, causing the logo of the shirt 550 to skew to the right. The image augmentation additionally augments any logos or patterns on the object, as shown in FIG. 5.

Figure 6:
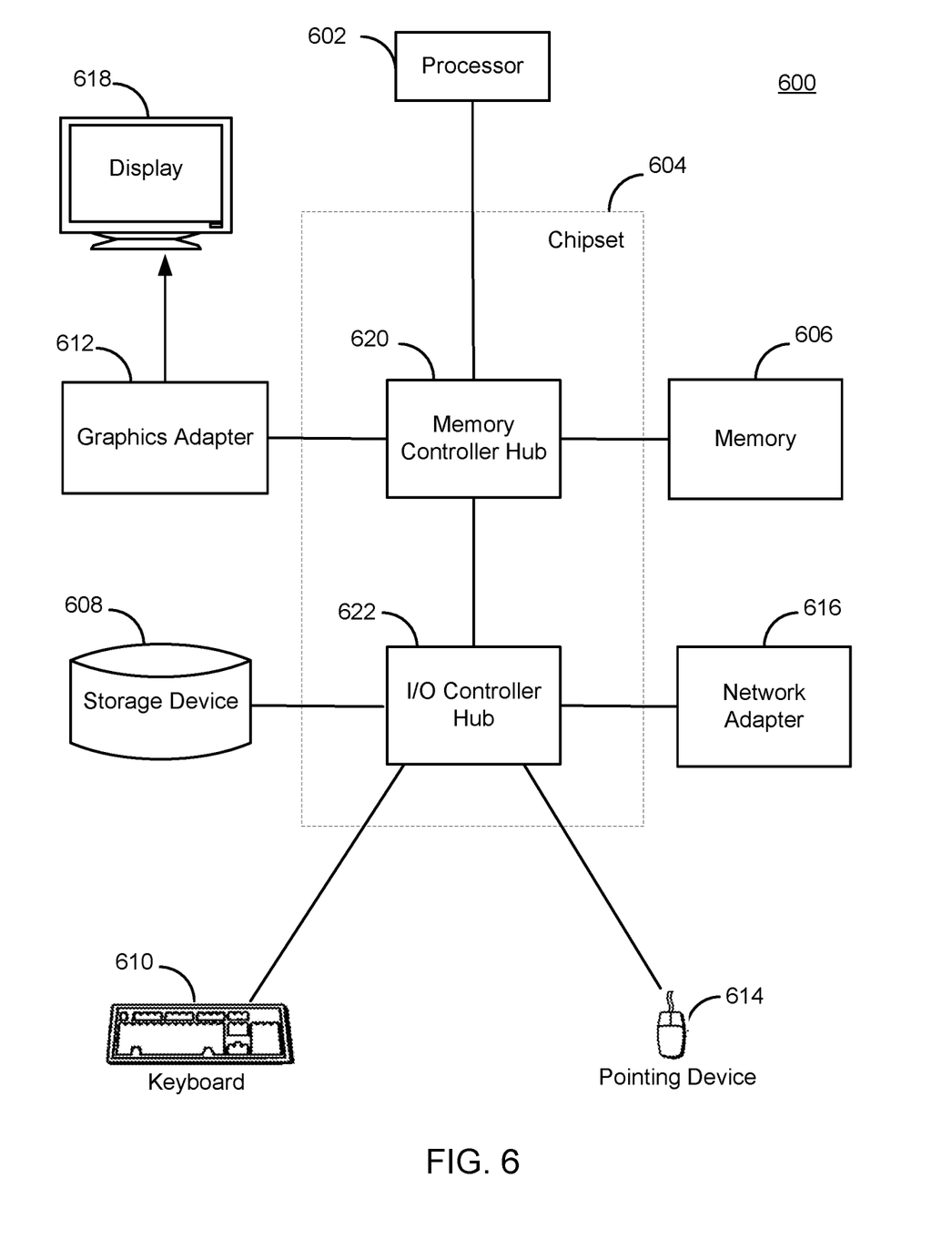
FIG. 6 illustrates a computer suitable for use in the system environment of FIG. 1, in accordance with an embodiment.

FIG. 6 is a high-level block diagram illustrating an example computer 600 suitable for use as the object identification system 140, third party system 130, or client device 110. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer system 600. The graphics adapter 612 displays images and other information on the display 618. The network adapter 616 couples the computer system 600 to one or more computer networks, such as network 120.

The types of computers used by the entities of FIGS. 1-2 can vary depending upon the embodiment and the processing power required by the entity. For example, the object identification system 140 might include a distributed database system comprising multiple servers working together to provide the functionality described herein. Furthermore, the computers can lack some of the components described above, such as keyboards 610, graphics adapters 612, and displays 618.

While the embodiments described herein use a neural network to identify clothing items in images, one of skill in the art would understand that similar techniques could be used to identify other objects, such as handbags, shoes, or other accessories, etc.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating synthetic training data for training a convolutional neural network to identify objects in images. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. It is therefore intended that the scope of the invention be limited not by this detailed description, but rather by any claims that issue on an application based hereon. Accordingly, the disclosure of the embodiments of the invention is intended to be illustrative but not limiting the scope of the invention, which is set forth in the following claims.

What is claimed is:

1. A computer-implemented method for generating an item of synthetic training data used to train a convolutional neural network, the method comprising:
    receiving, by a processor, a source image depicting an object for identification;
    determining, by the processor, a type and shape of the depicted object;
    overlaying, by the processor, the source image with an N×M grid of vertices and horizontal and vertical edges to fit the shape of the depicted object;
    for each vertex in the grid, adding perturbations to (x,y) coordinates of the vertex based on the type of the depicted object; and
    interpolating pixel values in a range between original and final (x,y) coordinates to generate an item of synthetic training data.

2. The computer-implemented method of claim 1, further comprising manipulating a magnitude of perturbations for specific object parts of the depicted object by manipulating the grid to include non-uniform distribution of vertices.

3. The computer-implemented method of claim 1, wherein the source image is received from a third-party system and is associated with metadata including information about the depicted object.

4. The computer-implemented method of claim 3, further comprising determining the type and shape of the depicted object based on the received metadata.

5. The computer-implemented method of claim 1, further comprising determining the type and shape of the depicted object using a machine learning classifier.

6. The computer-implemented method of claim 1, wherein a size of the N×M grid is based in part on the type and shape of the depicted object in the source image.

7. The computer-implemented method of claim 1, further comprising:
    identifying different portions of the depicted object based on a known taxonomy; and
    adding larger perturbations to portions of the depicted object having a larger predicted range of motion.

8. The computer-implemented method of claim 1, further comprising repeating the synthetic training data generation method to generate a plurality of items of synthetic training data.

9. The method of claim 8, wherein repeating the synthetic training data generation method comprises manipulating the (x,y) coordinates of the vertices differently for each item of synthetic training data.

10. The method of claim 8, wherein the plurality of items of synthetic training data are used to train the convolutional neural network to identify the depicted object in an image.

11. A non-transitory computer-readable storage medium storing computer-executable instructions that, in response to executing, cause a device comprising a processor to perform operations, comprising:
    receiving a source image depicting an object for identification;
    determining a type and shape of the depicted object;
    overlaying the source image with a N×M grid of vertices and horizontal and vertical edges to fit the shape of the depicted object;
    for each vertex in the grid, adding perturbations to (x,y) coordinates of the vertex; and interpolating pixel values in a range between original and final (x,y) coordinates to generate an item of synthetic training data.

12. The non-transitory computer-readable storage medium of claim 11, wherein the operations further comprise manipulating a magnitude of perturbations for specific object parts of the depicted object by manipulating the grid to include non-uniform distribution of vertices.

13. The non-transitory computer-readable storage medium of claim 11, wherein the source image is received from a third-party system and is associated with metadata including information about the depicted object.

14. The non-transitory computer-readable storage medium of claim 13, wherein the operations further comprise determining the type and shape of the depicted object based on the received metadata.

15. The non-transitory computer-readable storage medium of claim 11, wherein the operations further comprise determining the type and shape of the depicted object using a machine learning classifier.

16. The non-transitory computer-readable storage medium of claim 11, wherein a size of the N×M grid is based in part on the type and shape of the depicted object in the source image.

17. The non-transitory computer-readable storage medium of claim 11, wherein the operations further comprise:
    identifying different portions of the depicted object based on a known taxonomy; and
    adding larger perturbations to portions of the depicted object having a larger predicted range of motion.

18. The non-transitory computer-readable storage medium of claim 11, wherein the operations further comprise repeating the synthetic training data generation method to generate a plurality of items of synthetic training data, and wherein repeating the synthetic training data generation method comprises manipulating the (x,y) coordinates of the vertices differently for each item of synthetic training data.

19. The non-transitory computer-readable storage medium of claim 18, wherein the plurality of items of synthetic training data are used to train the convolutional neural network to identify the depicted object in an image.

20. A computer-implemented method comprising:
    generating a plurality of items of synthetic training data comprising:
        receiving, by a processor, a source image depicting an object for identification;
        determining, by the processor, a type and shape of the depicted object;
        overlaying, by the processor, the source image with an N×M grid of vertices and horizontal and vertical edges to fit the shape of the depicted object;
        for each vertex in the grid, adding perturbations to (x,y) coordinates of the vertex; and
        interpolating pixel values in a range between original and final (x,y) coordinates to generate an item of synthetic training data;
        repeating the addition of perturbations and pixel interpolations on the source image overlayed with the N×M grid to create a plurality of items of synthetic training data, wherein the (x,y) coordinates of the vertices are manipulated differently for each item of synthetic training data;
    training a convolutional neural network using the plurality of items of synthetic training data; and
    identifying the object with the trained convolutional neural network comprising:
        receiving, by a processor, an input image depicting the object;
        identifying the object in the input image;
        retrieving metadata associated with the object, based on the identification of the object; and
        outputting the retrieved metadata.

* * * * *

UNITED STATES PATENT AND TRADEMARK OFFICE
CERTIFICATE OF CORRECTION

| | |
|---|---|
| PATENT NO. | : 11,455,492 B2 |
| APPLICATION NO. | : 17/520443 |
| DATED | : September 27, 2022 |
| INVENTOR(S) | : Einstein et al. |

It is certified that error appears in the above-identified patent and that said Letters Patent is hereby corrected as shown below:

On the Title Page

In Column 2, item (57) under "Abstract", Line 1, delete "computer implemented" and insert -- computer-implemented --, therefor.

In the Claims

In Column 12, in Claim 9, Line 49, delete "method" and insert -- computer-implemented method --, therefor.

In Column 12, in Claim 10, Line 53, delete "method" and insert -- computer-implemented method --, therefor.

Signed and Sealed this
Ninth Day of May, 2023

Katherine Kelly Vidal
*Director of the United States Patent and Trademark Office*